| (12) | United States Patent | (10) Patent No.: | US 9,137,517 B2 |
|---|---|---|---|
| | Geris et al. | (45) Date of Patent: | Sep. 15, 2015 |

(54) METHODS AND DEVICES FOR GENERATING A STEREOSCOPIC IMAGE

(71) Applicant: RESEARCH IN MOTION LIMITED, Waterloo (CA)

(72) Inventors: Ryan Alexander Geris, Kitchener (CA); Amandeep Singh Bhullar, Waterloo (CA); William Keith Baker, Belfountain (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 363 days.

(21) Appl. No.: 13/645,540

(22) Filed: Oct. 5, 2012

(65) Prior Publication Data

US 2014/0098193 A1 Apr. 10, 2014

(51) Int. Cl.
H04N 13/02 (2006.01)

(52) U.S. Cl.
CPC ....... H04N 13/0239 (2013.01); H04N 13/0242 (2013.01); H04N 2213/001 (2013.01)

(58) Field of Classification Search
CPC .......... H04N 13/0239; H04N 13/0242; H04N 2213/001; H04N 13/0296; H04N 13/0055; H04N 2013/0081; G06T 7/0022
USPC .......................................................... 348/47
See application file for complete search history.

(56) References Cited

U.S. PATENT DOCUMENTS

| 4,674,853 A | * | 6/1987 | Street | 396/330 |
|---|---|---|---|---|
| 5,396,583 A | * | 3/1995 | Chen et al. | 345/427 |
| 6,141,034 A | * | 10/2000 | McCutchen | 348/36 |
| 6,177,950 B1 | * | 1/2001 | Robb | 348/14.01 |
| 6,711,355 B1 | * | 3/2004 | Smart et al. | 396/316 |
| 7,271,803 B2 | * | 9/2007 | Ejiri et al. | 345/427 |
| 2004/0066449 A1 | * | 4/2004 | Givon | 348/48 |
| 2005/0167558 A1 | * | 8/2005 | Smith | 248/317 |
| 2006/0274534 A1 | * | 12/2006 | Chang et al. | 362/362 |
| 2007/0248260 A1 | * | 10/2007 | Pockett | 382/154 |
| 2008/0316301 A1 | * | 12/2008 | Givon | 348/49 |

(Continued)

FOREIGN PATENT DOCUMENTS

| EP | 1447995 A2 | 8/2004 |
|---|---|---|
| WO | 2010091113 A2 | 8/2010 |

(Continued)

OTHER PUBLICATIONS

Amazon Wireless, "HTC EVO 3D 4G Android Phone, Black (Sprint)", retrieved Jun. 22, 2012.

(Continued)

*Primary Examiner* — Shan Elahi
(74) *Attorney, Agent, or Firm* — Rowand LLP

(57) ABSTRACT

Methods and devices for generating a stereoscopic image are described. In one aspect, the electronic device includes a main body and a support rotatably coupled with the main body about an axis of rotation. The support is rotatable between a plurality of positions including a first position and a second position. The electronic device also includes a first camera module for generating first camera data and a second camera module for generating second camera data. The second camera module is positioned in spaced relation to the first camera module and coupled to the support away from the axis of rotation. The electronic device further includes a controller coupled with the first camera module and the second camera module.

14 Claims, 11 Drawing Sheets

(56) References Cited

U.S. PATENT DOCUMENTS

| | | |
|---|---|---|
| 2009/0219437 A1* | 9/2009 | Baugher et al. ............ 348/385.1 |
| 2010/0194860 A1 | 8/2010 | Mentz et al. |
| 2010/0207774 A1* | 8/2010 | Song ............................ 340/669 |
| 2011/0050714 A1* | 3/2011 | Sekiguchi et al. ............ 345/531 |
| 2011/0098083 A1* | 4/2011 | Lablans ..................... 455/556.1 |
| 2011/0117958 A1 | 5/2011 | Kim et al. |
| 2012/0038747 A1* | 2/2012 | Kim et al. ....................... 348/47 |
| 2012/0056998 A1* | 3/2012 | Kang et al. ...................... 348/47 |
| 2012/0147146 A1 | 6/2012 | Namgoong et al. |
| 2012/0224029 A1* | 9/2012 | Pavani et al. .................... 348/47 |
| 2013/0250109 A1* | 9/2013 | Yokota .......................... 348/148 |
| 2014/0066122 A1* | 3/2014 | Shukla et al. .............. 455/556.1 |
| 2014/0152852 A1* | 6/2014 | Ito et al. ..................... 348/207.1 |

FOREIGN PATENT DOCUMENTS

| | | | |
|---|---|---|---|
| WO | 2012029298 A1 | 3/2012 | |
| WO | WO2012/071479 | 5/2012 | |
| WO | WO 2012103554 A2 * | 8/2012 | ............... H04B 1/38 |

OTHER PUBLICATIONS

Miller, "Forwarding Thinking, CTIA: Are 3D Cell Phones a Passing Fad?", May 25, 2011.

EPO, Extended European Search Report relating to application No. 12187499.4 dated Dec. 21, 2012.

CIPO, CA Office Action relating to Application No. 2,827,594, dated Feb. 11, 2015.

* cited by examiner

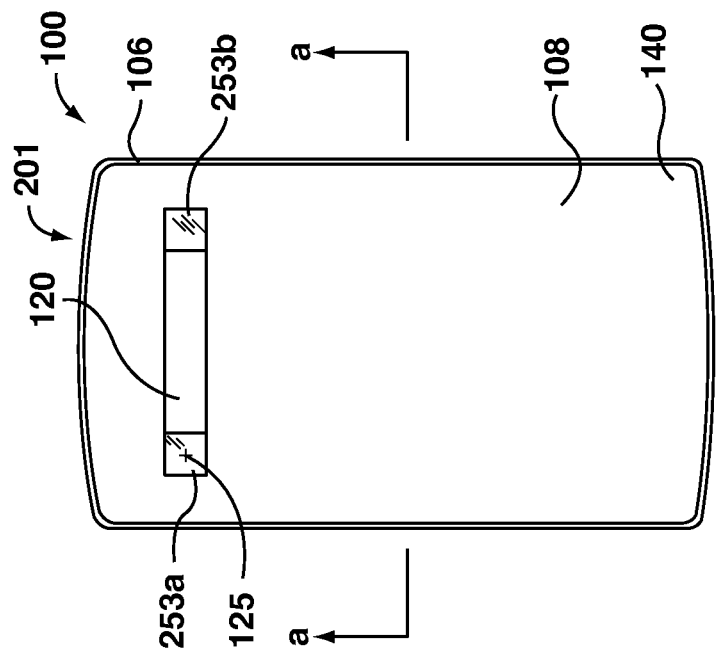
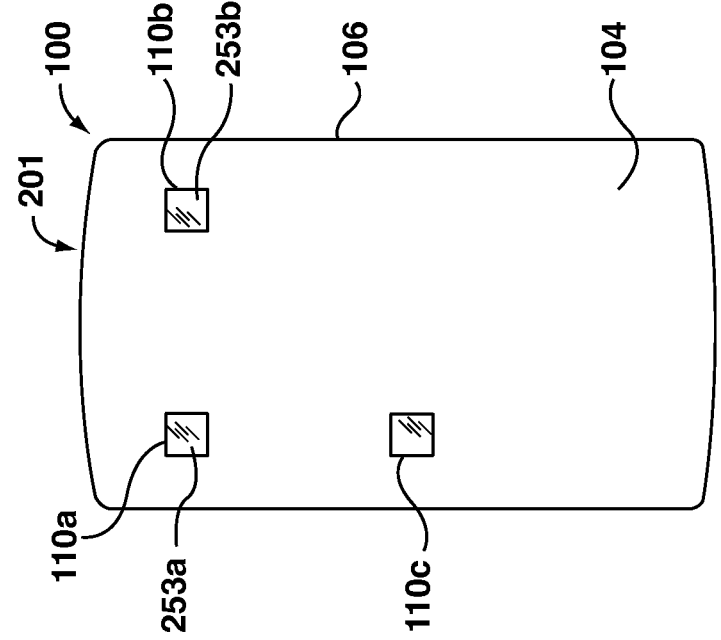

METHODS AND DEVICES FOR GENERATING A STEREOSCOPIC IMAGE

TECHNICAL FIELD

The present disclosure relates to camera systems, and more particularly, to methods and devices for generating a stereoscopic image.

BACKGROUND

Electronic devices such as smartphones and tablet computers are often equipped with one or more cameras. For example, electronic devices may be equipped with a front-facing camera, which is oriented to capture an image of a subject located near a side of the electronic device which includes the main display of the electronic device. Electronic devices may also be equipped with a rear facing camera, which is oriented to capture an image of a subject located near a side of the electronic device which does not include the main display of the electronic device.

Electronic devices equipped with cameras often provide various features and functionalities for the cameras. A user of the electronic device may control camera features to capture an image based on the user's preferences. Features of the cameras that may be controlled include the camera lens aperture size, shutter speed, external flash, zooming, focusing, etc.

Some electronic devices provide camera features for stereoscopic image capture and display. Such electronic devices are often equipped with two cameras that are on a common side (e.g. that are both on a rear side) of the electronic device and spaced apart. Such electronic devices allow stereoscopic images to be captured.

BRIEF DESCRIPTION OF THE DRAWINGS

Reference will now be made, by way of example, to the accompanying drawings which show an embodiment of the present application, and in which:

FIG. 3 is an example rear view of the example electronic device of FIG. 2;

FIG. 4 is an example rear view of the example electronic device of FIG. 2 with a rear housing cover removed;

Like reference numerals are used in the drawings to denote like elements and features.

DETAILED DESCRIPTION OF EXAMPLE EMBODIMENTS

In one aspect, the present application describes an electronic device. The electronic device includes a main body and a support rotatably coupled with the main body about an axis of rotation. The support is rotatable between a plurality of positions including a first position and a second position. The electronic device also includes a first camera module for generating first camera data and a second camera module for generating second camera data. The second camera module is positioned in spaced relation to the first camera module and coupled to the support away from the axis of rotation. The electronic device further includes a controller coupled with the first camera module and the second camera module.

In another aspect, the present application describes a method implemented by a controller of an electronic device. The electronic device includes a main body and a support rotatably coupled with the main body about an axis of rotation. The support is rotatable between a plurality of positions including a first position and a second position. The electronic device also includes a first camera module for generating first camera data and a second camera module for generating second camera data. The second camera module is positioned in spaced relation to the first camera module and coupled to the support away from the axis of rotation. The electronic device further includes an orientation sensor for generating orientation data based on an orientation of the electronic device. The method includes: obtaining orientation data from the orientation sensor; and rotating the support based on the orientation data.

In yet another aspect, the present application describes a camera assembly. The camera assembly includes a drive providing rotational output and a support rotatably coupled with the drive at an axis of rotation. The support is rotatable between a plurality of positions including a first position and a second position. The camera assembly also includes a first camera module for generating first camera data and a second camera module for generating second camera data. The second camera module is positioned in spaced relation to the first camera module and coupled to the support away from the axis of rotation.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
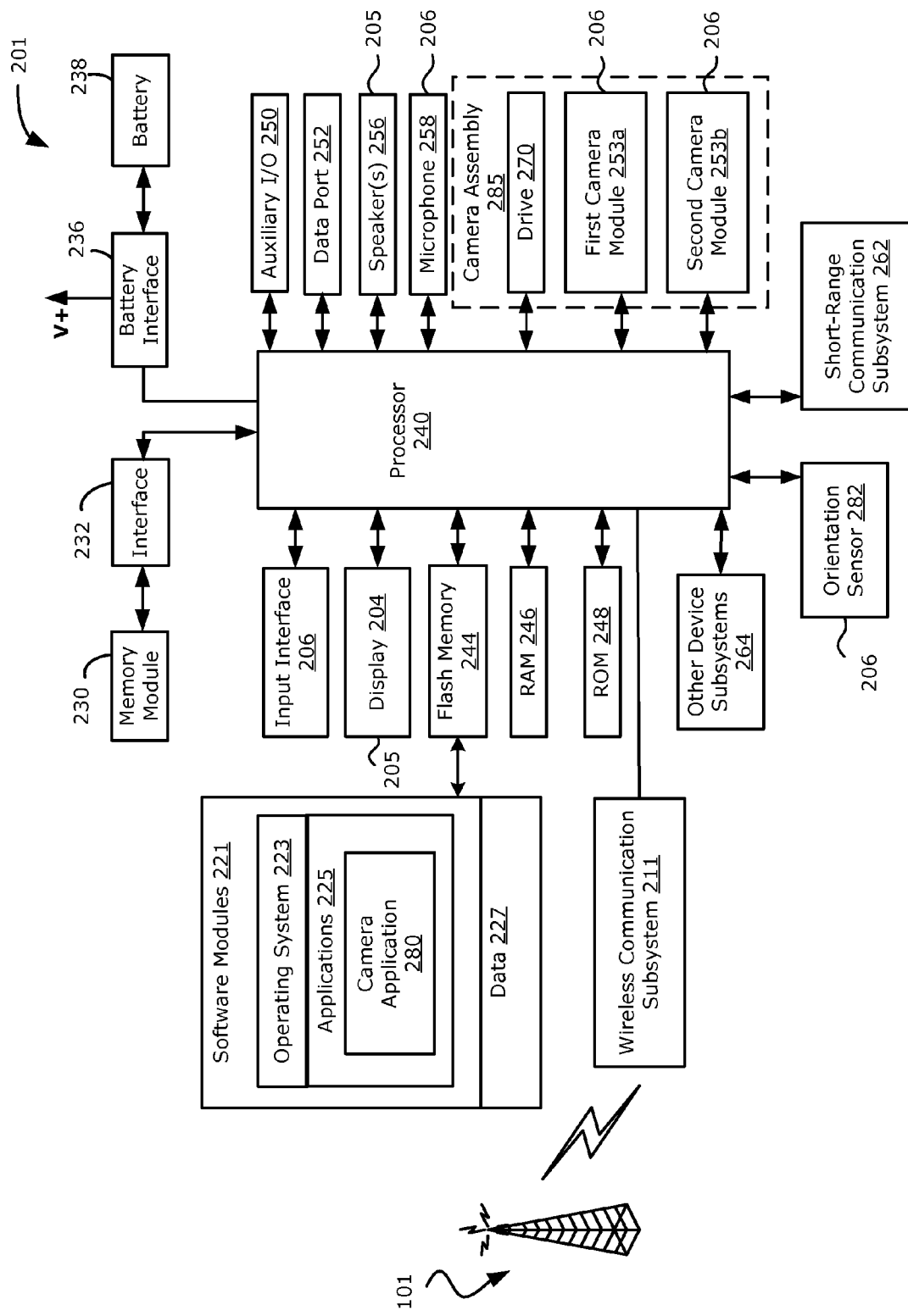
FIG. 1 is a block diagram of an example electronic device in accordance with example embodiments of the present disclosure.

Reference is first made to FIG. 1 which illustrates an example electronic device 201 in which example embodiments described in the present disclosure can be applied. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device). However, in other example embodiments, the electronic device 201 may not be portable (i.e. may not be a "mobile" device) and/or may not be configured to communicate with other systems (i.e. may not be a "communication" device).

Depending on the functionality provided by the electronic device 201, in various example embodiments the electronic device 201 may be a multiple-mode communication device configured for both data and voice communication, a mobile telephone such as a smartphone, a wearable computer such as a watch, a tablet computer such as a slate computer, a personal digital assistant (PDA), or a computer system. The electronic device 201 may take other forms apart from those specifically listed above. The electronic device 201 may also, in various example embodiments, be referred to as a mobile communications device, a communication device, a mobile device, an electronic device and, in some cases, as a device.

The electronic device 201 includes a housing, housing the components of the electronic device 201. The internal components of the electronic device 201 are constructed on a printed circuit board (PCB). The electronic device 201 includes a controller including at least one processor 240 (such as a microprocessor) which controls the overall operation of the electronic device 201. It will be appreciated that, in at least some example embodiments, the controller may, instead of or in addition to the processor 240, include an analog circuit or other types of circuits capable of performing a part or all of the functions of the processor 240 that are described herein. The processor 240 interacts with device subsystems such as a wireless communication subsystem 211 for exchanging radio frequency signals with a wireless network 101 to perform communication functions. The processor 240 may be communicably coupled with additional device subsystems including one or more output interfaces 205 (such as a display 204 and/or a speaker 256), one or more input interfaces 206 (such as a first camera module 253a, a second camera module 253b, a microphone 258, a keyboard (not shown), an orientation sensor 282, control buttons (not shown), a touch-sensitive overlay (not shown) associated with a touchscreen display and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display 204). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The particular design of the wireless communication subsystem 211 depends on the wireless network 101 in which the electronic device 201 is intended to operate. The wireless network 101 may include one or more of a Wireless Wide Area Network (WWAN) and/or a Wireless Local Area Network (WLAN) and/or other suitable network arrangements. In some example embodiments, the electronic device 201 is configured to communicate over both the WWAN and WLAN, and to roam between these networks. The electronic device 201 may send and receive communication signals over the wireless network 101 via the wireless communication subsystem 211 after the required network registration or activation procedures have been completed.

In at least some example embodiments, the auxiliary input/output (I/O) subsystems 250 may include an external communication link or interface; for example, an Ethernet connection. The electronic device 201 may include other wireless communication interfaces for communicating with other types of wireless networks 101; for example, a wireless network 101 such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (i.e. touch feedback).

In at least some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

The electronic device 201 includes a first camera module 253a and a second camera module 253b. The camera modules 253a, 253b are capable of capturing camera data such as images in the form of still photographs and/or motion video. The camera data may be captured in the form of an electronic signal which is produced by an image sensor associated with each of the camera modules 253a, 253b. The camera modules 253a, 253b may be collectively capable of capturing stereoscopic images for display. That is, the camera modules 253a, 253b may collectively produce stereoscopic image data which defines a stereoscopic image. Stereoscopic images may provide an illusion of depth in the images to a user (i.e. three dimensional (3-D) images).

To produce stereoscopic image data, the camera modules 253a, 253b are oriented in generally the same direction. For example, as will be discussed below, in at least some embodiments, the camera modules 253a, 253b may both be rear-facing. That is, the camera modules 253a, 253b are, in some example embodiments, both arranged to capture an image of a subject on a rear side of the electronic device 201.

The first camera module 253a and the second camera module 253b are mounted in spaced relation to one another. That is, there may be a space between the camera modules 253a, 253b. The first camera module 253a and the second camera module 253b are spaced apart in order to capture stereoscopic images. The distance between the camera modules 253a, 253b may be approximately the same as the distance between a standard person's eyes (which is around 6.35 cm). In at least some example embodiments, the distance between the camera modules 253a, 253b may be smaller or larger than the distance between a person's eyes. A larger distance between the camera modules 253a, 253b may allow for capturing stereoscopic images that produces an enhanced effect of stereoscopy for a user.

Since the camera modules 253a, 253b are offset from one another, so too are the images they produce. That is, the first camera module 253a captures a first image, and the second camera module 253b captures a second image that is offset from the first image. The first image is captured at a different position than the second image due to the positioning of the first camera module 253a and the second camera module 253b. The offset between the first image and the second image is defined by the distance (referred to as the intra-axial distance) between the first camera module 253a and the second camera module 253b.

Accordingly, stereoscopic image data may be produced by the camera modules 253a, 253b. Such stereoscopic image data includes two images—a first image produced using the first camera module 253a, and a second image produced using the second camera module 253b. The first image and the second image may be captured at the same time or approximately the same time, but may be offset in appearance due to the spacing between the camera modules 253a, 253b.

In at least some example embodiments, one or more of the camera modules 253a, 253b may be movable relative to other components of the electronic device 201. That is, as will be illustrated in greater detail below with reference to FIGS. 3 to 12, one or more of the camera modules 253a, 253b may be configured to rotate about an axis of rotation to allow the first camera module 253a and the second camera module 253b to capture stereoscopic images when the orientation of the electronic device 201 changes. In at least some embodiments, the camera modules 253a, 253b are configured to maintain a horizontal orientation which allows the camera modules 253a, 253b to be aligned with the horizon. As will be described in greater detail below, in order to rotate one or more of the cameras, one or more of the cameras may be connected to a support that is rotatably connected to the electronic device 201. Rotation of the support about an axis of rotation may cause the camera(s) mounted thereon to rotate about the axis of rotation.

The camera modules 253a, 253b may be both configured as front facing cameras or may both be configured as rear facing cameras. Front facing cameras are provided by camera modules 253a, 253b that are located to obtain images near a front face of the electronic device 201. The front face is typically the face on which a main display 204 is mounted. That is, when front facing cameras are provided on the electronic device 201, the display 204 is configured to display content which may be viewed from a side of the electronic device 201 where the camera modules 253a, 253b are directed.

Rear facing cameras are provided by camera modules 253a, 253b which are located to obtain images of a subject near a rear side of the electronic device 201. The rear side is typically a side which does not include the main display 204 of the electronic device 201. In at least some embodiments, the electronic device 201 may operate in one operating mode in which the display 204 acts as a viewfinder displaying image data associated with rear facing cameras.

The rear facing cameras may obtain images which are not within the field of view of the front facing cameras. The field of view of the front facing and rear facing cameras may generally be in opposing directions.

While FIG. 1 illustrates a two camera modules 253a, 253b, the electronic device 201 may include more than two camera modules 253a, 253b.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable or Bluetooth® connection to the host computer system for processing.

In at least some example embodiments, the electronic device 201 may include one or more sensors. For example, the electronic device 201 may include an orientation sensor 282 that detects the orientation of the electronic device 201 or that generates information from which the orientation of the electronic device 201 can be determined, such as acceleration information. In some example embodiments, the orientation sensor 282 is an accelerometer, such as a three-axis accelerometer. An accelerometer is a sensor which converts acceleration from motion (e.g. movement of the electronic device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer. In other example embodiments, the orientation sensor 282 may be of other forms instead of or in addition to an accelerometer. For example, the orientation sensor 282 may be a gravity sensor, a gyroscope, a tilt sensor, an electronic compass or other suitable sensors, or combinations thereof.

The orientation sensor 282 may generate orientation data which specifies the orientation of the electronic device 201. The orientation data, in at least some example embodiments, specifies the orientation of the electronic device 201 relative to the gravitational field of the earth. In at least some example embodiments, the received orientation data may be classified to determine a particular orientation of the electronic device 201, such as a portrait orientation, a landscape orientation and/or specific orientations in between a portrait and landscape orientation (i.e. the classified orientation data may indicate the typical orientations of the electronic device 201 when held by a user to capture images). Accordingly, in at least some example embodiments, the orientation data may be used to configure the electronic device 201 to capture stereoscopic images for a particular orientation of the electronic device 201. For example, in at least some example embodiments, the orientation data may be used to rotate one or more of the camera modules 253a, 253b. A support may be rotated to horizontally align the camera modules 253a, 253b (e.g. to align the cameras with the horizon) in order to capture stereoscopic images when the orientation of the electronic device 201 is changed.

The electronic device 201 may also include a drive 270 to rotate the support that supports one or more of the camera modules 253a, 253b about an axis of rotation. The drive 270 couples the support to the main body of the electronic device 201 at the axis of rotation. As will be described in greater detail below, in at least some example embodiments, the drive 270 may be attached to the support at one end of the support. In at least some example embodiments, the drive 270 may be attached to the support at a mid-point of the support.

The drive 270 may include any mechanism that provides rotational output. In at least some embodiments, the drive may be an electric motor such as a servo. The drive 270 may be controlled by a controller, such as the processor 240. The drive 270 allows the electronic device 201 to control the position of one or more of the camera modules 253a, 253b relative to other components of the electronic device.

In at least some example embodiments, the drive 270 may rotate based on the orientation data. As noted above, the electronic device 201 may include an orientation sensor 282 which may generate orientation data specifying the orientation of the electronic device 201. The orientation data may be utilized to cause the drive 270 to rotate the support which supports one or more of the camera modules 253a, 253b. Accordingly, in at least some example embodiments, the drive 270 may rotate the support based on the orientation data to align the camera modules 253a, 253b to capture stereoscopic images (since one or more of the camera modules 253a, 253b are disposed on the support, rotation of the support may cause rotation of the camera module(s)).

In at least some example embodiments, the electronic device 201 may include a camera assembly 285 that includes the camera modules 253a, 253b, the drive 270, the support and/or other components. That is, these components may be part of a camera assembly 285 on the electronic device 201. The camera assembly 285 may be a separate component that is attachable to and/or removable from the electronic device 201, or permanently fixed within the electronic device 201. In at least some embodiments, the camera assembly 285 may be packaged within a camera assembly housing which houses components of the camera assembly 285 apart from other components of the electronic device.

The electronic device 201 also includes or is connectable to a power source such as a battery 238. The battery 238 may be one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information used by the electronic device 201 to establish and maintain communication with the wireless network 101. The data 227 may also include user application data such as email messages, address book and contact information, image data, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the memory.

The electronic device 201 may, in at least some example embodiments, be a mobile communication device which may provide two principal modes of communication: a data communication mode and a voice communication mode. In the data communication mode, a received data signal such as a text message, an email message, or a web page download are processed by the wireless communication subsystem 211 and input to the processor 240 for further processing. For example, a downloaded web page may be further processed by a browser application or an email message may be processed by an email messaging application and output to the display 204. A user of the electronic device 201 may also compose data items, such as email messages, for example, using the input devices in conjunction with the display 204. These composed items may be transmitted through the wireless communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (e.g., a voice communication module) and hardware (e.g., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225.

The software applications 225 on the electronic device 201 may also include a range of additional applications including, for example, a notepad application, Internet browser application, voice communication (e.g. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

A predetermined set of applications that control basic device operations, including data and possibly voice communication applications may be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable device subsystem 264. The downloaded programs or code modules may be permanently installed, for example, written into the program memory (i.e. the flash memory 244), or written into and executed from the RAM 246 for execution by the processor 240 at runtime.

The processor 240 may be electrically connected to the camera modules 253a, 253b to allow the processor 240 to receive electronic signals representing camera data from the camera modules 253a, 253b.

In at least some embodiments, the software modules 221 may include one or more camera applications 280 or software modules which are configured for handling the electronic signals representing camera data from the camera modules 253a, 253b. The camera application 280 may, for example, be configured to provide a viewfinder on the display 204 by displaying, in real time or near real time, images defined in the electronic signals received from the camera modules 253a, 253b. The camera application 280 may also be configured to capture images or videos by storing images or videos defined by the electronic signals received from the camera modules 253a, 253b. For example, the camera application 280 may be configured to store the images or videos to memory, for example the flash memory 244 of the electronic device 201. The images may be stored in various formats including JPEG, RAW, BMP etc.

The camera application 280 may also be configured to control options or preferences associated with the camera modules 253a, 253b. For example, the camera application 280 may be configured to control camera lens apertures and/or shutter speeds associated with the camera modules 253a, 253b. The control of such features may, in at least some example embodiments, be automatically performed by the camera application 280 based on output received from a light exposure meter.

In at least some example embodiments, the camera application 280 may be configured to control a flash associated with the camera modules 253a, 253b and/or to control a zoom level associated with the camera modules 253a, 253b. In at least some example embodiments, the camera application 280 is configured to provide digital zoom features. The camera application 280 may provide digital zoom features by cropping an image down to a centered area with the same aspect ratio as the original. In at least some example embodiments, the camera application 280 may interpolate within the cropped image to bring the cropped image back up to the pixel dimensions of the original. The camera application 280 may, in at least some example embodiments, provide image stabilization for the camera modules 253a, 253b. Image stabilization may reduce blurring associated with movement of the camera modules 253a, 253b.

In at least some example embodiments, the camera application 280 may be configured to focus the camera modules 253a, 253b on an object (i.e. an identifiable item, such as an individual or thing). More particularly, the camera application 280 may be configured to control actuators of the camera modules 253a, 253b to move lenses (a lens may be comprised of one or more lens elements) in the camera modules 253a, 253b relative to image sensors in the camera modules 253a, 253b. For example, when capturing images of objects which are very close to the camera modules 253a, 253b (e.g. object at macro position), the camera application 280 may control the actuators to cause the actuators to move the lenses away from the image sensors.

In at least some example embodiments, the camera application 280 (or another application 225) may be configured to process electronic signals of images captured by camera modules 253a, 253b for stereoscopic display. That is, the camera application 280 may assemble camera data obtained from the camera modules 253a, 253b into one or more stereoscopic images.

In at least some example embodiments, the camera application 280 may be configured to allow for simultaneous operation of the camera modules 253a, 253b. That is, the camera application 280 may allow the camera modules 253a, 253b to simultaneously capture images. For example, a user may input an instruction to the electronic device 201 via an input interface 206 instructing the electronic device 201 to capture an image. In response, the electronic device 201 may simultaneously capture an image using both the first camera module 253a and the second camera module 253b; a first image is captured using the first camera module 253a and a second image is captured using the second camera module 253b. The first image and the second image may be captured at approximately the same time. These images may collectively form stereoscopic image data.

In at least some example embodiments, the camera application 280 (or another application 225) may be configured to control the positioning of the camera modules 253a, 253b in order to capture stereoscopic images. For example, the camera application 280 may re-align the camera modules 253a, 253b when the orientation of the electronic device 201 is changed. For example, in at least some example embodiments, the camera application 280 may obtain orientation data from the orientation sensor 282 (which generates orientation data based on the orientation of the electronic device 201), and rotate a support which supports one or more of the camera modules 253a, 253b based on the orientation data.

As mentioned above, the support may support one or more camera modules 253a, 253b, and by rotating the support, one or more camera modules 253a, 253b are rotated. In at least some example embodiments, the camera application (or another application) may rotate the support to horizontally align the first camera module 253a and the second camera module 253b (i.e. to align these camera modules 253a, 253b with the horizon). For example, if the camera modules 253a, 253b are currently positioned to be horizontal when the electronic device 201 is positioned in a portrait orientation (i.e. where its height is longer than its width) and the orientation of the electronic device is changed to a landscape orientation (i.e. where its width is longer than its height), the camera application 280 may rotate either one of the camera modules 253a, 253b or both of the camera modules 253a, 253b in order to horizontally align them to capture stereoscopic images. Specific functions and features of the camera application 280 will be discussed in greater detail below with reference to FIG. 13.

While the embodiment discussed above includes a processor 240 coupled with a camera application 280 which collectively act as an image signal processor to provide image related functions such as auto-focusing, in other example embodiments (not shown), another processor such as a dedicated image signal processor, may provide some or all of these functions. In at least some embodiments, the dedicated processor may be included in the camera assembly 285.

In at least some example embodiments, the operating system 223 may perform some or all of the functions of the camera application 280. In other example embodiments, the functions or a portion of the functions of the camera application 280 may be performed by one or more other applications. For example, in at least some example embodiments, the rotation functions may be performed by one or more other applications.

Further, while the camera application 280 has been illustrated as a stand-alone application, in other example embodiments, the camera application 280 may be implemented as part of the operating system 223 or another application 225. Furthermore, in at least some example embodiments, the functions of the camera application 280 may be provided by a plurality of software modules. In at least some example embodiments, these software modules may be divided among multiple applications.

Example Electronic Device

As discussed above, the electronic device 201 may take a variety of forms. For example, in at least some example embodiments, the electronic device 201 may be a smartphone.

Figure 2:
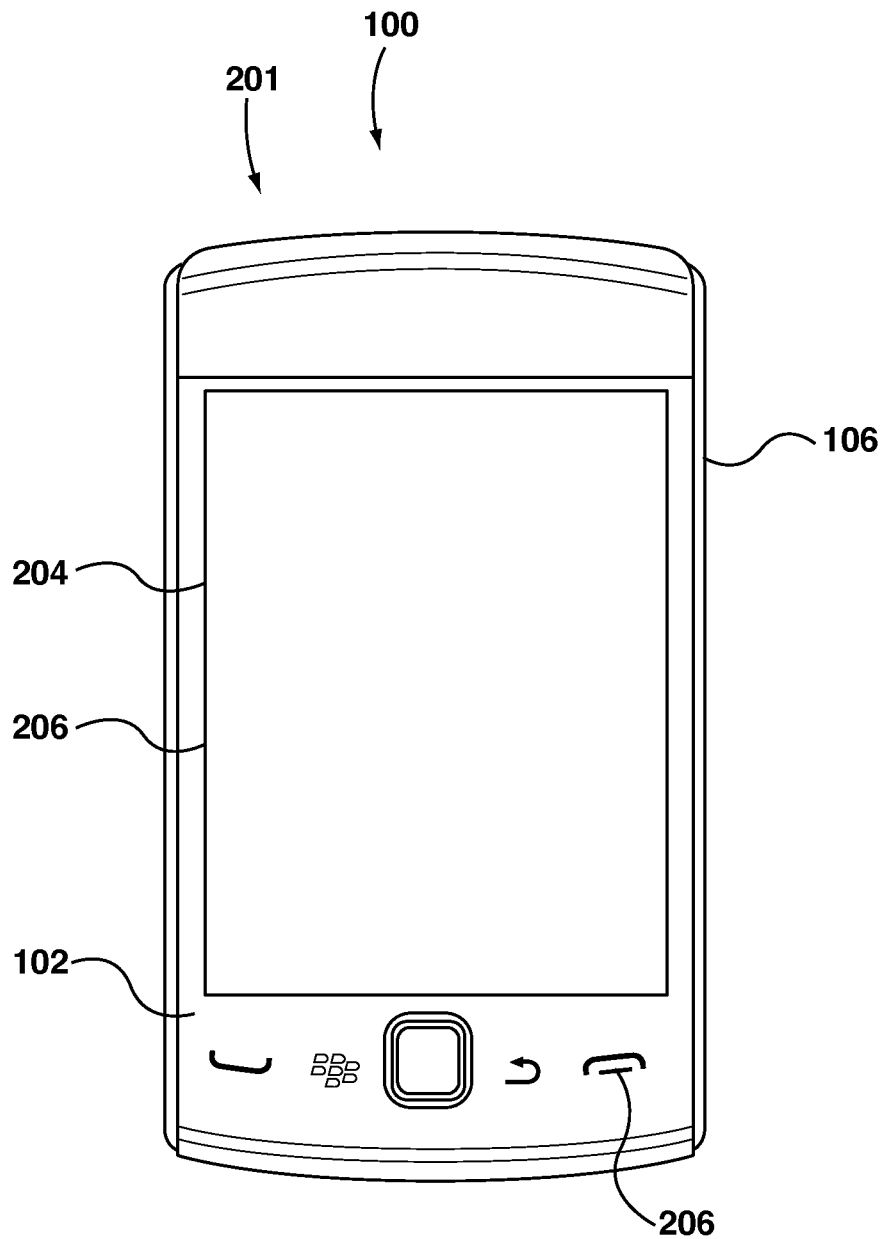
FIG. 2 is a front view of an example electronic device in accordance with example embodiments of the present disclosure.

Referring now to FIG. 2, a front view of an example electronic device 201 which is a smartphone 100 is illustrated. The smartphone 100 is a mobile phone which offers more advanced computing capability than a basic non-smartphone cellular phone. For example, the smartphone 100 may have the ability to run third party applications which are stored on the smartphone 100.

The smartphone 100 may include the components discussed above with reference to FIG. 1 or a subset or superset of those components. The smartphone 100 includes a housing 106 which houses at least some of the components discussed above with reference to FIG. 1.

In the example embodiment illustrated, the electronic device 201 includes a display 204, which may be a touch-screen display which acts as an input interface 206. The display 204 is disposed within the electronic device 201 so that it is viewable at a front side 102 of the electronic device 201. That is, a viewable side of the display 204 is disposed on the front side 102 of the electronic device 201. In the example embodiment illustrated, the display 204 is framed by the housing 106.

The example electronic device 201 also includes other input interfaces 206 such as one or more buttons, keys or navigational input mechanisms. In the example embodiment illustrated, at least some of these additional input interfaces 206 are disposed for actuation at a front side 102 of the electronic device.

Referring now to FIG. 3, a rear view of the example electronic device 201 is illustrated. The example electronic device 201 includes a first camera module 253a and a second camera module 253b that are configured as rear facing cameras located on a rear side 104 of the electronic device 201. That is, the rear facing cameras are located on a side of the electronic device 201 which does not include the display 204. The rear facing cameras are located so that they may capture images of objects which are located in the rear of and/or surrounding the rear side 104 of the electronic device 201. In at least some example embodiments, the electronic device 201 may operate in at least one operating mode in which the display 204, on the front side 102 of the electronic device 201, acts as a viewfinder displaying image data associated with the rear facing cameras.

The housing 106 of the electronic device 201 on the rear side 104 may include one or more transparent housing portions 110a, 110b, 110c. The transparent housing portions are non-opaque portions that may be aligned with the camera modules 253a, 253b in order to allow light to pass to image sensors associated with each of the camera modules 253a, 253b. That is, the camera modules 253a, 253b may each be aligned underneath a transparent housing portion in order to receive light and capture an image. In the example illustrated, the camera modules 253a, 253b are viewable through the transparent portions.

In the illustrated example embodiment, the housing 106 of the electronic device 201 on the rear side 104 includes a first transparent portion 110a, a second transparent portion 110b and a third transparent portion 110c. As mentioned above, one or more of the camera modules 253a, 253b may be mounted on a support that is rotatable between a plurality of positions including a first position and a second position. Each transparent portion 110a, 110b, 110c may be located to be aligned with a corresponding camera module 253a, 253b when the support is in at least one of those positions.

In the example illustrated, the transparent portions on the rear side 104 are located to align the first transparent portion 110a with the first camera module 253a for all positions of the support, and to align the second transparent portion 110b with the second camera module 253b when the support is in the first position, and to align the third transparent portion 110c with the second camera module 253b when the support is in the second position. That is, the first camera module 253a remains aligned with the first transparent portion 110a irrespective of rotation of the support, while the second camera module 253a is movable between a first position that is aligned with the second transparent portion 110b and a second position that is aligned with the third transparent portion 110c.

In at least some example embodiments, the support may be rotatable to horizontally align the camera modules 253a, 253b in order to capture stereoscopic images. For example, the camera modules 253a, 253b may be aligned based on the orientation of the electronic device 201 (e.g. they may be aligned with the horizon). In the illustrated example embodiment, the electronic device 201 is held in a portrait orientation, and the support may be positioned in such a manner that the first camera module 253a is aligned with the first transparent portion 110a and the second camera module 253b is aligned with the second transparent portion 110b. Accordingly, the camera modules 253a, 253b are horizontally aligned (i.e. a line extending between the midpoint of both camera modules 253a, 253b is substantially horizontal) and spaced apart in order to capture stereoscopic images when the electronic device 201 is held in the portrait orientation. Similarly, when the orientation of the electronic device 201 is changed to a landscape orientation (which will be discussed with reference to FIG. 5), the support may be positioned in such a manner that the first camera module 253a is aligned with the first transparent portion 110a and the second camera module 253b is aligned with the third transparent portion 110c. Accordingly, the camera modules 253a, 253b may be horizontally aligned and spaced apart in order to capture stereoscopic images when the electronic device 201 is held in the landscape orientation. Greater details of the functions and features of the camera assembly (including the support) are provided below with reference to FIGS. 4 to 12.

The transparent portions of the housing 106 on the rear side 104 of the electronic device 201 may, in at least some example embodiments, be of a different configuration. For example, one or more transparent portions of the housing 106 may be configured as an arc that is aligned with a path of rotation of a camera module mounted on the support. That is, the arc may be centered on the axis of rotation of the support and may be aligned with a camera module. In at least some embodiments, this configuration may allow light to pass to the camera modules for all positions at which the camera modules may be situated, thereby allowing the electronic device 201 to capture stereoscopic images in virtually any orientation.

By way of example, the transparent portions may include a first transparent portion 110a that is aligned with the first camera module 253a (similar to the illustrated example embodiment of FIG. 3) and an arc-shaped transparent portion that is centered on the axis of rotation and is aligned with the second camera module 253a when the support rotates between the first position and the second position. That is, the second camera module 253a may be aligned with the arc-shaped transparent portion and be capable of capturing an image even when the support is at a position between the orthogonal first and second positions represented by the transparent portions illustrated in FIG. 3 (i.e. a position between 0 degree point and 90 a degree point of a 90 degree arc).

It will be appreciated that the housing 106 may include transparent portions of other configurations not specifically described herein.

In at least some example embodiments, the electronic device 201 may also include one or more front facing cameras instead of, or in addition to, the rear facing cameras. The front facing cameras may be located on the front side 102 of the electronic device 201.

Camera Assembly

Figure 5:
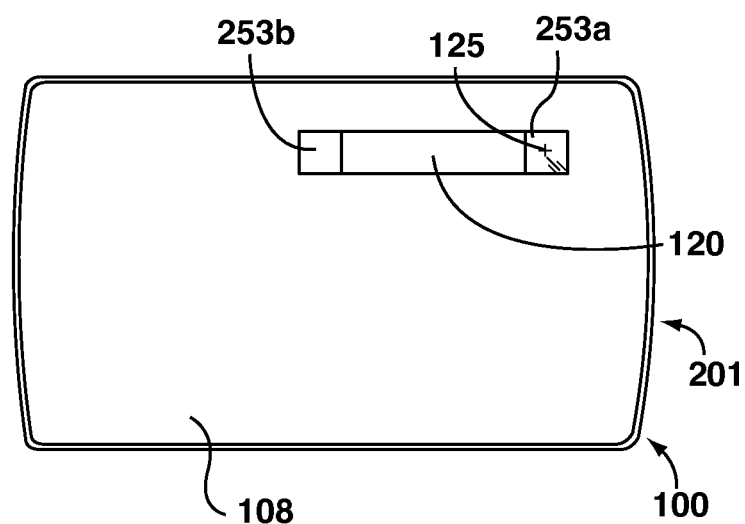
FIG. 5 is another example rear view of the example electronic device of FIG. 2 with the rear housing cover removed.
Figure 6:
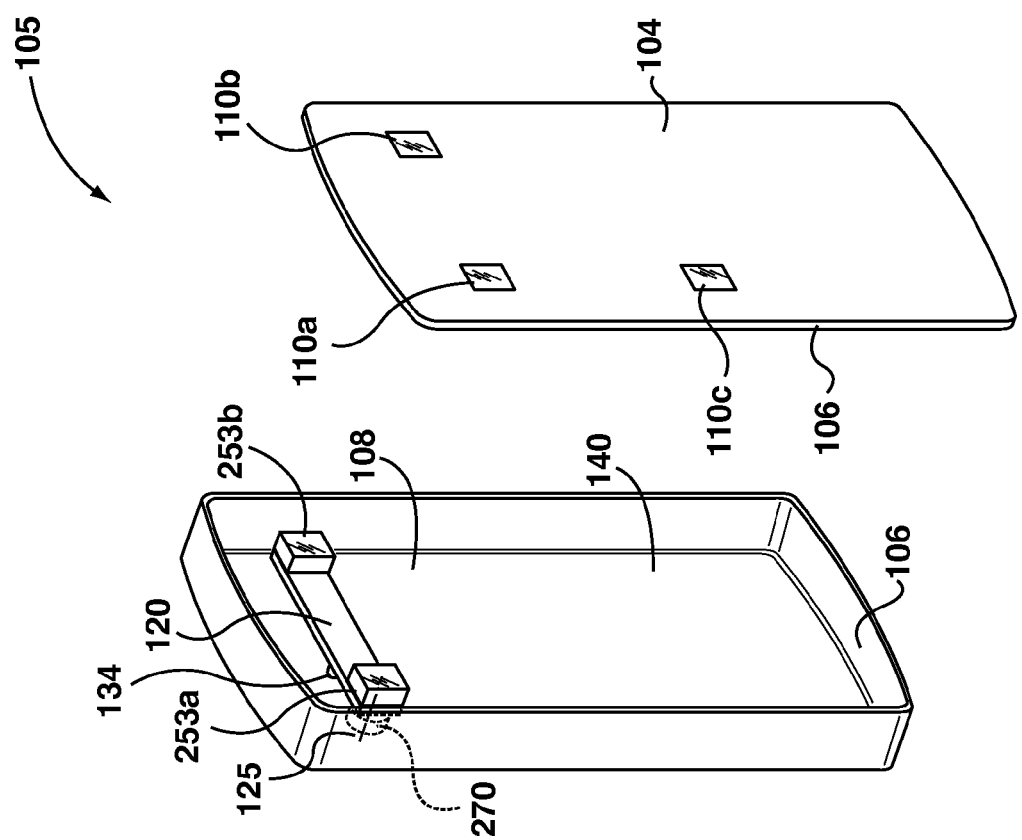
FIG. 6 is an exploded perspective view of example components of the electronic device.
Figure 7:
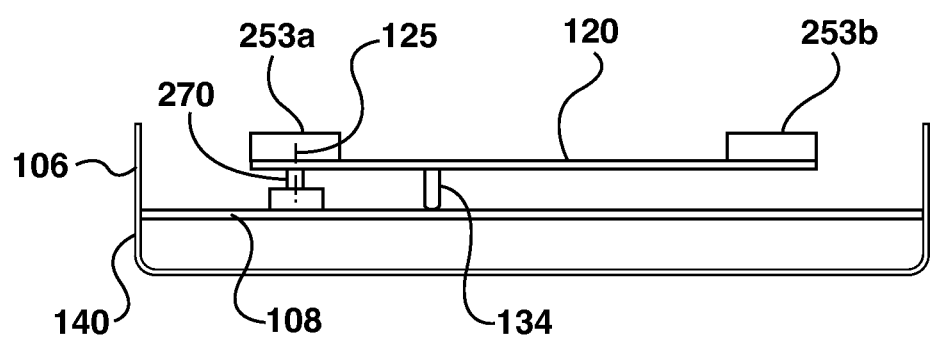
FIG. 7 is an example cross sectional view of the example electronic device taken along line a-a of FIG. 4.
Figure 8:
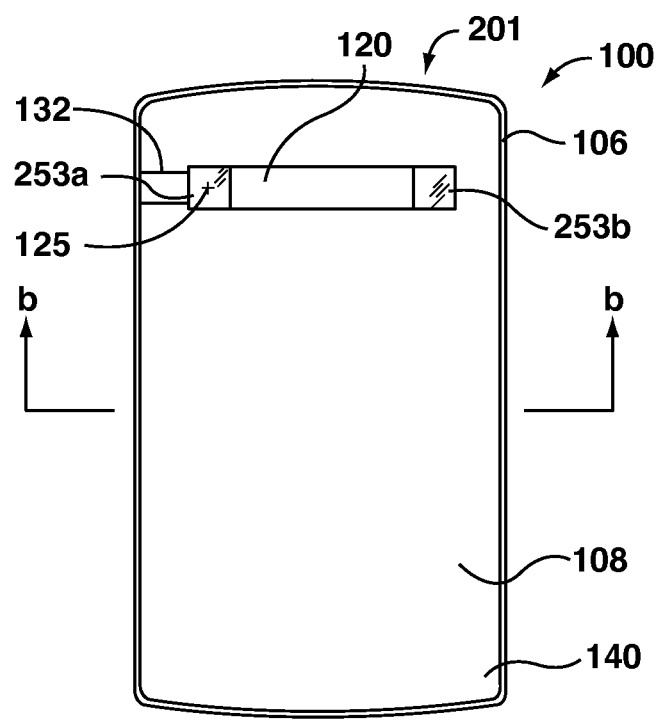
FIG. 8 is a rear view of another example electronic device with the rear housing cover removed.
Figure 9:
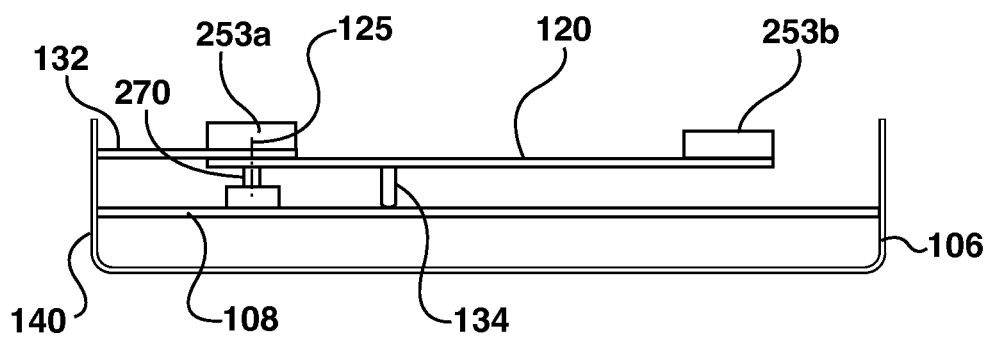
FIG. 9 is another example cross sectional view of the example electronic device taken along line b-b of FIG. 8.

Reference will now be made to FIGS. 4 to 9 which show example embodiments of the electronic device 201 (which is a smartphone 100 in the illustrated embodiment) including the camera assembly 285 (FIG. 1). More particularly, FIG. 4 illustrates an example rear view of the electronic device with the housing 106 removed. FIG. 5 illustrates another example rear view of the electronic device with the housing 106 removed. FIG. 6 illustrates a perspective view of the electronic device. FIG. 7 illustrates a cross sectional view of the electronic device taken along line a-a of FIG. 4. FIG. 8 illustrates a further example rear view of the electronic device with the housing removed and FIG. 9 illustrates another cross sectional view of the electronic device taken along line b-b of FIG. 8. Reference will first be made to the embodiment of FIGS. 4 to 7.

Referring first to FIG. 4, an example rear view of the electronic device 201 of FIG. 2 is illustrated with the rear housing cover removed. A main body 140 is illustrated. The main body 140 may include a housing 106 which houses components of the electronic device (such as the camera assembly 285). The main body 140 may include a printed circuit board (PCB) 108. The main body 140 includes components of the electronic device 201 apart from the camera assembly 285.

The main body 140 supports the camera assembly 285. More particularly, the support 120 that supports one or more of the camera modules 253a, 253b is rotatably connected to the main body 140 to allow it to rotate about an axis of rotation 125.

In the illustrated example, the axis of rotation 125 is near one end of the support 120, allowing the support 120 to rotate about the axis of rotation 125 to a plurality of positions including a first position and a second position. For example, the support 120 is depicted at the first position where the support 120 is horizontally aligned at a portrait orientation of the electronic device 201. That is, when the support is in the first position (which is illustrated in FIG. 4), the camera modules 253a, 253b are aligned with the horizon when the electronic device 201 is in a portrait orientation in which it height is longer than its width.

The support 120 may be movable to a second position where the support 120 is horizontally aligned at a landscape orientation of the electronic device 201. That is, when the support is in the second position (which is illustrated in FIG. 5) the camera modules 253a, 253b are aligned with the horizon when the electronic device is in a landscape orientation in which its length is longer than its height.

In the example illustrated in FIGS. 4 and 5, the first position and the second position represent terminal positions for movement. That is, the support 120 may be moved between the first position and the second position but not beyond these positions. In the example illustrated, these terminal positions are orthogonal. That is, when the support is in the first position it is orthogonal to its position when it is in the second position.

Accordingly, the support 120 may be movable along a 90 degree arc where at the first position, the support 120 is at 0 degrees and at the second position, the support 120 is at 90 degrees. The position of the second camera module 253b when the support is at these first and second positions may correspond to the position of some of the transparent portions 110b, 110c discussed with reference to FIG. 3 to allow light to be transmitted to the second camera module 253b when the support is in the first position and when it is in the second position.

The first camera module 253a and the second camera module 253b are mounted on the support 120, and are in spaced relation to one another. For example, the first camera module 253a is mounted on one end of the support 120 and the second camera module 253b is mounted on the other end of the support 120. In the illustrated example embodiment, the first camera module 253a is disposed along the axis of rotation 125. Accordingly, in this example, the first camera module 253a remains at the same location when the support is rotated while the second camera module 253b is rotatable about the axis of rotation 125 with the support 120.

The electronic device 201 of FIG. 4 is illustrated at a portrait orientation and the support 120 is in the first position. In at least some example embodiments, the orientation of the electronic device 201 may be changed as illustrated in FIG. 5, which shows another example rear view of the electronic device 201 with the rear housing cover removed.

With reference to FIG. 5, the electronic device 201 is orientated to a landscape orientation. The support 120 is rotated by 90 degrees about the axis of rotation 125, and is moved from the first position (shown in FIG. 4) to a second position (shown in FIG. 5).

At the second position, the first camera module 253a and second camera module 253b are horizontally aligned and may be configured to capture stereoscopic images. That is, the support 120 is rotated to horizontally align the camera modules 253a, 253b in order to capture stereoscopic images at the landscape orientation of the electronic device 201.

In at least some example embodiments, the electronic device 201 may include an orientation sensor 282 (FIG. 1) that generates orientation data based on the orientation of the electronic device 201. For example, when the orientation of the electronic device 201 is changed from a portrait orientation (as shown in FIG. 4) to a landscape orientation (as shown in FIG. 5), the orientation sensor 282 may generate orientation data for the electronic device 201 based on the change in orientation. The electronic device 201 may utilize the orientation data to cause the drive 270 to rotate the support 120 based on the orientation data. For example, the electronic device 201 may utilize the orientation data to cause the drive 270 to rotate the support about the axis of rotation 125 (in order to horizontally align the camera modules 253a, 253b).

In the illustrated example embodiments of FIGS. 4 and 5, there may be some orientations of the electronic device 201 at which the support 120 may not be horizontally aligned. That is, due to the arrangement of the camera assembly 285, there may be some orientations at which the support may not be moveable to a position in which it is horizontally aligned. Similarly, due to the location and arrangement of the transparent portions 110a, 110b, 110c of the housing (FIG. 3), for some orientations of the electronic device 201, if the support 120 were to be horizontally aligned, a camera module 253a, 253b could be moved to a position at which it is not aligned with a transparent portion 110a, 110b, 110c and would not be capable of receiving light from light sources that are external to the electronic device 201. For example, if the electronic device 201 includes a housing 106 having transparent portions of the type illustrated in FIG. 3, only two positions of the support would allow the second camera module 253b to be aligned with a transparent portion 110b, 110c. Other positions of the support would cause the second camera to not be aligned with those transparent portions 110b, 110c. The electronic device 201 may be configured to avoid such positions when horizontally aligning the support.

Accordingly, in at least some example embodiments, the electronic device 201 may determine whether the orientation of the electronic device 201 is closer to the landscape orientation or to a portrait orientation. For example, the electronic device 201 may utilize the orientation data to perform the determination process when the electronic device 201 is oriented between the portrait orientation and the landscape orientation. If the electronic device 201 determines that the orientation of the electronic device 201 is closer to the portrait orientation, the electronic device 201 may cause the drive 270 to rotate the support 120 to the first position. That is, if the electronic device 201 is tilted closer to the portrait orientation than the landscape orientation, the support is rotated to the first position where the camera modules 253a and 253b are in positions associated with the portrait orientation of the electronic device 201 (as shown in FIG. 4). If the electronic device 201 determines that the orientation of the electronic device 201 is closer to the landscape orientation, the electronic device 201 may cause the drive to rotate the support to the second position. That is, if the electronic device 201 is tilted closer towards the landscape orientation, the support 120 is rotated to the second position where the camera modules 253a, 253b are in positions associated with the landscape orientation of the electronic device 201 (as shown in FIG. 5). Accordingly, the camera modules 253a, 253b are placed as close as possible to a horizontal alignment in order to capture stereoscopic images when the electronic device 201 is at an orientation between the portrait orientation and the landscape orientation.

As illustrated in FIG. 6, the camera assembly 285 (FIG. 1) also includes a drive 270 (FIG. 1) that couples the support 120 (which supports one or more of the camera modules 253a, 253b) to the main body 140 at the axis of rotation 125. As mentioned above, the drive 270 provides rotational output in order the rotate the support 120 (and accordingly the second camera module 253b) about the axis of rotation 125.

The main body 140 supports the support 120 using the drive 270. More particularly, the drive 270 is coupled, at one end, with the main body 140 and, at another end, with the support 120. The end of the drive 270 that is coupled with the support 120 is rotatable relative to the end of the drive 270 that is coupled with the main body 140. Thus, the support 120 is rotatable relative to the main body 140 about an axis of rotation 125. The drive 270 may be configured to allow the support to rotate between a first position and a second position (which may be the positions described above and/or below).

The drive 270 is located at the axis of rotation 125 and forms the attachment between the support 120 and the PCB 108 (and the main body 140). The drive 270 provides the rotational output (which may be based on the orientation data from an orientation sensor 282 (FIG. 1)) to rotate the support about the axis of rotation 125.

The drive 270 may be electrically coupled with the processor 240. More particularly, the PCB 108 and/or another connector may couple the drive 270 with the processor 240 to allow the processor 240 to control the drive 270. The processor 240 may control the rotational position of the support 120 by controlling the drive 270.

In the embodiment illustrated, the first camera module 253a is mounted on the support 120 along the axis of rotation 125, and the second camera module 253b is also mounted on the support 120 but away from the axis of rotation 125. Accordingly, the first camera module 253a rotates but remains at the same location and the second camera module 253b moves between a first position and a second position when the support 120 is rotated.

Camera data that is output from a camera module 253a, 253b may be provided to a processor 240 for processing and/or to a memory for storage. Thus, the camera modules 253a, 253b may be electrically connected to other components of the electronic device 201. In at least some embodiments, the support 120 includes a movable connector 134 (illustrated in FIGS. 6 and 7) to maintain an electrical connection for the camera modules 253a, 253b with the PCB 108 (and thus with components connected to the PCB 108 such as the processor 240) when the support 120 is rotated. For example, the connector 134 may be rotatable along a 90 degrees arc with the support 120 and keep the camera modules 253a, 253b connected to the PCB 108 to send and receive electrical signals when the support 120 is moved between the first position and the second position. In the embodiment illustrated, the movable connector protrudes from the support 120 and engages one or more contact pads (not shown) on the PCB 108. The contact pads may be formed as arcs having a center at the axis of rotation 125. Accordingly, the connector 134 may be attached to the support and may be movable to maintain an electrical connection for the camera modules 253a, 253b with the PCB 108 when the support rotates (i.e. the connector 134 rotates with the support 120). Other types of connectors may also be used.

As illustrated in the perspective view of FIG. 6, the camera modules 253a, 253b are aligned with the transparent portions of the housing 106 in order to receive light and capture images. For example, the first transparent portion 110a is aligned with the first camera module 253a and the second transparent portion 110b is aligned with the second camera module 253b when the support is in the first position (for example, when the camera modules 253a, 253b are horizontally aligned when the electronic device 201 is oriented at the portrait orientation described above); and the first transparent portion 110a remains aligned with the first camera module 253a and the third transparent portion 110c is aligned with the second camera module 253b when the support is in the second position (for example, when the camera modules 253a, 253b are horizontally aligned when the electronic device 201 is oriented at the landscape orientation described above).

In the example embodiment described above with reference to FIGS. 3 to 7, both camera modules 253a, 253b are mounted on the rotatable support 120. In the illustrated example embodiment, when the support 120 rotates, the first camera module 253a remains along the axis of rotation 125 while the second camera module 253b rotates with the support 120 and changes its position (for example, from a first position to a second position). However, as the first camera module 253a is located along the axis of rotation 125, the first camera module 253a may also rotate around the axis of rotation 125 when the support 120 rotates. That is, the first camera module 253a may spin around the axis of rotation 125 without changing its relative position. However, in other embodiments, one of the camera modules may be fixedly mounted to the main body 140. That is, one of the camera modules 253a, 253b may be coupled to the electronic device 201 so that it is not rotatable relative to the main body 140 of the electronic device 201 and rotation of images captured by the camera module 253a, 253b that is not rotatable may be performed, for example by the processor 240.

Referring now to FIGS. 8 and 9, one such example embodiment is illustrated. In the example embodiment of FIGS. 8 and 9, the first camera module 253a is located along the axis of rotation 125 but is not disposed on the support 120. Rather, the first camera module 253a is disposed on another support (such as a PCB 132) which is directly connected to the main body. This support fixedly connects the first camera module 253a to the main body 140 so that this camera module is not rotatable relative to the main body. The support that fixedly connects the first camera module 253a to the main body may be a PCB in order to maintain an electrical connection between the first camera module 253a and the main PCB 108 and its components.

Accordingly, the first camera module 253a does not rotate in any form when the support 120 rotates, and the first camera module 253a remains stationary relative to the main body 140. For example, when orientation of the electronic device 201 changes (e.g. from a portrait orientation to a landscape orientation), the first camera module 253a does not move and remains fixed while the second camera module 253b rotates with the support 120.

In such example embodiments, an image captured by the first camera module 253a may be rotated to correct for a change in orientation. Accordingly, in at least some example embodiments, an image captured by the first camera module 253a may be rotated prior to generating a stereoscopic image for at least one of the positions provided by the support 120. The rotation of the captured image may be performed by a lossy and/or lossless method as appreciated by those skilled in the art.

In FIGS. 8 and 9, the first camera module 253a is shown attached to another PCB 132. It will be appreciated that the configuration to support the first camera module 253a may be different in other example embodiments.

Further, while the discussion above has generally referred to the support 120 as being rotatably coupled with the PCB, in other embodiments, the support 120 may be coupled with other components of the main body. For example, in at least some example embodiments, the support 120 may be attached to the housing 106.

Additionally, in at least some example embodiments, the second camera module 253b may not be disposed at the end of the support 120. The second camera module 253b may be disposed in any location on the support away from the axis of rotation 125 and in spaced relation from the first camera module 253b.

Figure 11:
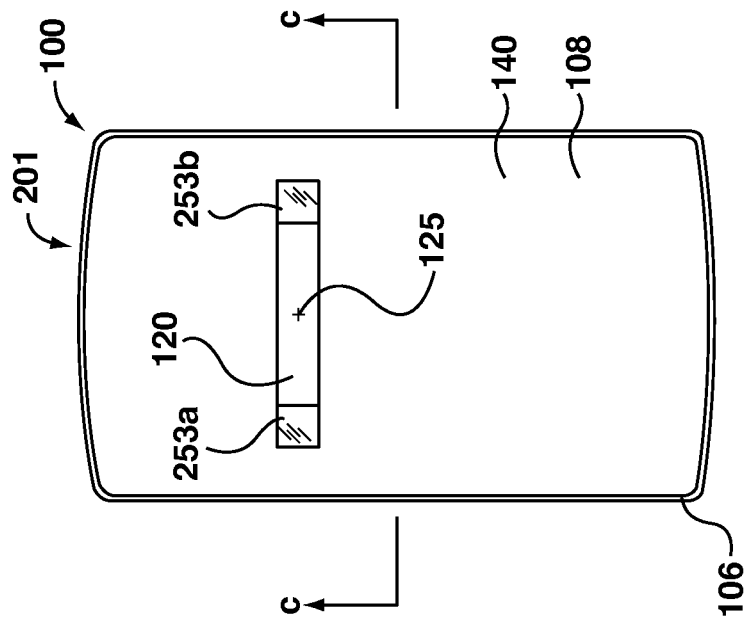
FIG. 11 is an example rear view of the example electronic device of FIG. 10 with the rear housing cover removed.
Figure 10:
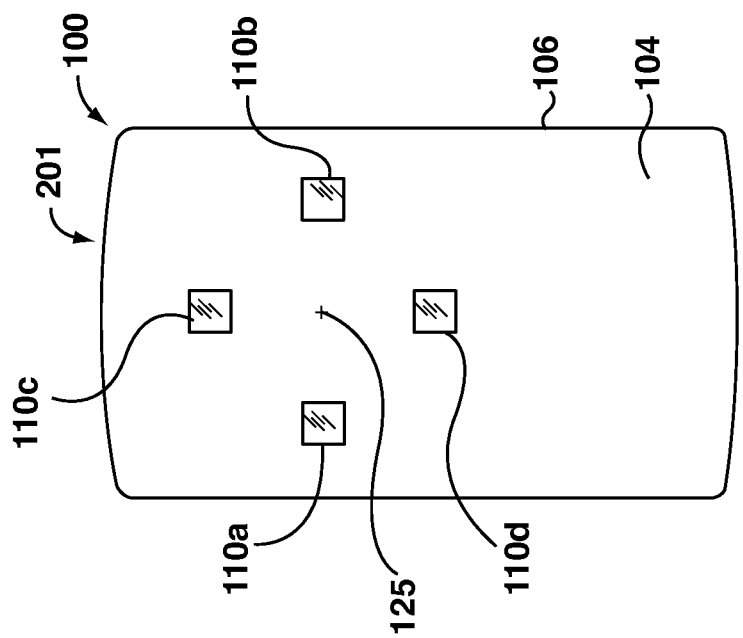
FIG. 10 is an example rear view of a further example electronic device.
Figure 12:
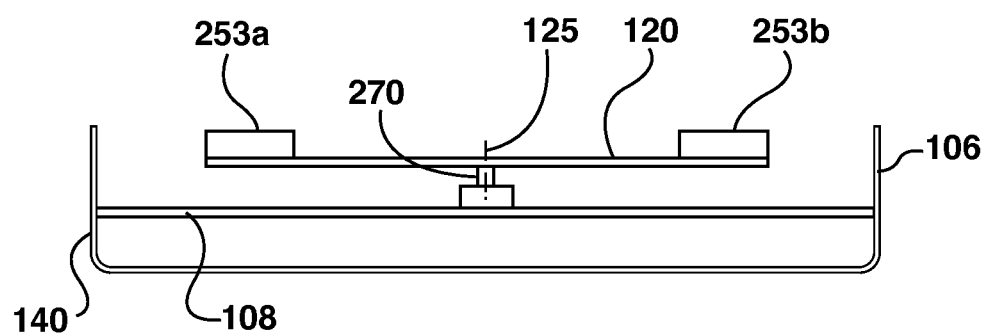
FIG. 12 is an example cross sectional view of the example electronic device taken along line c-c of FIG. 11.

Further, in at least some embodiments, both camera modules 253a, 253b may be positioned away from the axis of rotation 125. Reference will now be made to FIGS. 10 to 12 which show one such example embodiment of the electronic device 201.

FIG. 10 illustrates another example rear view of the electronic device 201 of FIG. 2. FIG. 11 illustrates another example rear view of the electronic device 201 with the rear housing cover removed. FIG. 12 illustrates a cross sectional view of the electronic device 201 taken along line c-c of FIG. 11.

The example electronic device 201 (which is a smartphone 100 in the example illustrated) includes the first camera module 253a and the second camera module 253b that are configured as rear facing cameras located on the rear side 104 of the electronic device 201 (similar to FIG. 3). The electronic device 201 also includes a housing 106 with a number of transparent portions 110a, 110b, 110c, 110d that are aligned with the camera modules 253a, 253b. In the illustrated example, the configuration of the transparent portions on the rear side 104 of the electronic device 201 is different than the configuration of the transparent portions on the rear side 104 of the electronic device 201 of FIG. 3.

More particularly, the housing 106 on the rear side 104 of the electronic device 201 includes a first transparent portion 110a, a second transparent portion 110b, a third transparent portion 110c and a fourth transparent portion 110d. As will be illustrated with reference to FIG. 12, the transparent portions are centered on an axis of rotation 125 of a rotatable support 120 that supports the first camera module 253a and the second camera module 253b. Accordingly, the first transparent portion 110a is aligned with the first camera module 253a and the second transparent portion 110b is aligned with the second camera module 253b when the support 120 is in the first position, and the third transparent portion 110c is aligned with the first camera module 253a and the fourth transparent portion 110d is aligned with the second camera module 253b when the support 120 is in the second position. For example, since the electronic device 201 may be configured to capture stereoscopic images, the support 120 may horizontally align the camera modules 253a, 253b at the first position for a portrait orientation of the electronic device 201, and the support 120 may horizontally align the camera modules 253a, 253b at the second position for a landscape orientation of the electronic device 201.

Referring next to FIG. 11, another example rear view of the electronic device 201 is illustrated with the rear housing cover removed. With the housing 106 removed, the camera assembly 285 (FIG. 1) is exposed. The camera assembly includes the support 120 that is rotatably coupled with the main body 140 (such as with the PCB 108) about an axis of rotation 125. The axis of rotation 125 is along the center of the support 120 and the support is rotatable 360 degrees. Accordingly, the support 120 may occupy a first position where the support 120 is horizontally aligned when the electronic device 201 is at a portrait orientation (as shown in FIG. 11) and may be movable to occupy a second position where the support is horizontally aligned when the electronic device is at a landscape orientation.

The first camera module 253a and the second camera module 253b are both mounted on the support 120 and may be equidistant from the axis of rotation 125. For example, the first camera module 253a is mounted at one end of the support 120 and the second camera module 253b is mounted on the other end of the support 120 with the axis of rotation 125 along the center of the support 120. Accordingly, both camera modules 253a, 253b are rotatable about the axis of rotation 125 with the support 120, and may be appropriately horizontally aligned to capture stereoscopic images based on the orientation of the electronic device 201.

Additionally, as the camera modules 253a, 253b are rotatable 360 degrees about the axis of rotation 125, they may be rotated to an upright position when the orientation of the electronic device is changed. For example, when the electronic device 201 is rotated upside down from the portrait orientation (i.e. it is rotated 180 degrees from a portrait orientation), the support 120 may be rotated 180 degrees in order to rotate the camera modules 253a, 253b to an upright position. Accordingly, captured images by the camera modules 253a, 253b may not need to be rotated to correct for a change in orientation of the electronic device 201.

Additional portions of the camera assembly 285 (FIG. 1) are illustrated in FIG. 12 which shows a cross sectional view of the electronic device 201 taken along line c-c of FIG. 11. FIG. 12 shows the drive 270 coupling the support 120 to the PCB 108 (and the main body 140) at the axis of rotation 125. The drive 270 is capable of rotating the support 120 and the corresponding camera modules 253*a*, 253*b*, three hundred and sixty (360) degrees about the axis of rotation 125. As mentioned above, in at least some example embodiments, the drive 270 may be configured to rotate the support 120 based on the orientation data (that is generated based on an orientation of the electronic device 201), and horizontally align the camera modules 253*a*, 253*b* for capturing and generating stereoscopic images.

It will be appreciated that the camera assembly 285 (FIG. 1) within the electronic device 201 may be of other configurations not specifically described herein. For example, in at least some example embodiments, the camera assembly 285 may include the support 120 with the camera modules 253*a*, 253*b* disposed on the support 120 and on the same side of the support 120 away from the axis of rotation 125. In at least some example embodiments, the camera modules 253*a*, 253*b* may not be equidistant from the axis of rotation 125 but instead, at differing distances from the axis of rotation 125. In at least some example embodiments, the camera assembly 285 may include more than two camera modules 253*a*, 253*b*.

It will be appreciated that the illustrated example embodiment of FIG. 10 shows one of a number of possible configurations of the transparent portions of the housing 106 on the rear side 104 of the electronic device 201. For example, in at least some example embodiments, the one or more transparent portions may include a ring-shaped or a circular-shaped transparent portion centered on the axis of rotation 125 that is aligned with the camera modules 253*a*, 253*b*. That is, the camera modules 253*a*, 253*b* are aligned with the ring-shaped or circular-shaped transparent portion at any position of rotation of the support 120 about the axis of rotation 125. Accordingly, the camera modules 253*a*, 253*b* may be horizontally aligned for any orientation of the electronic device 201 (including orientations in between a portrait orientation and a landscape orientation) and may be capable of capturing and generating stereoscopic images for any such orientation of the electronic device 201.

In at least some example embodiments, the one or more transparent portions may include a first arc-shaped transparent portion that is aligned with the first camera module 253*a* when the support 120 rotates between the first position and the second position, and a second arc-shaped transparent portion that is aligned with the second camera module 253*b* when the support 120 rotates between the first position and the second position. The first arc-shaped transparent portion and the second arc-shaped transparent portion are centered on the axis of rotation 125 and oppose one another. Accordingly, the camera modules 253*a*, 253*b* may also be horizontally aligned for any orientation of the electronic device 201 (including orientations in between a portrait orientation and a landscape orientation) and may be capable of capturing and generating stereoscopic images for any such orientation of the electronic device 201. However, in such example embodiments, images captured by the camera modules 253*a*, 253*b* may be rotated for certain orientations of the electronic device 201 prior to generating stereoscopic images.

It will be appreciated that the housing 106 may include transparent portions of other configurations not specifically described herein.

Generating a Stereoscopic Image

Figure 13:
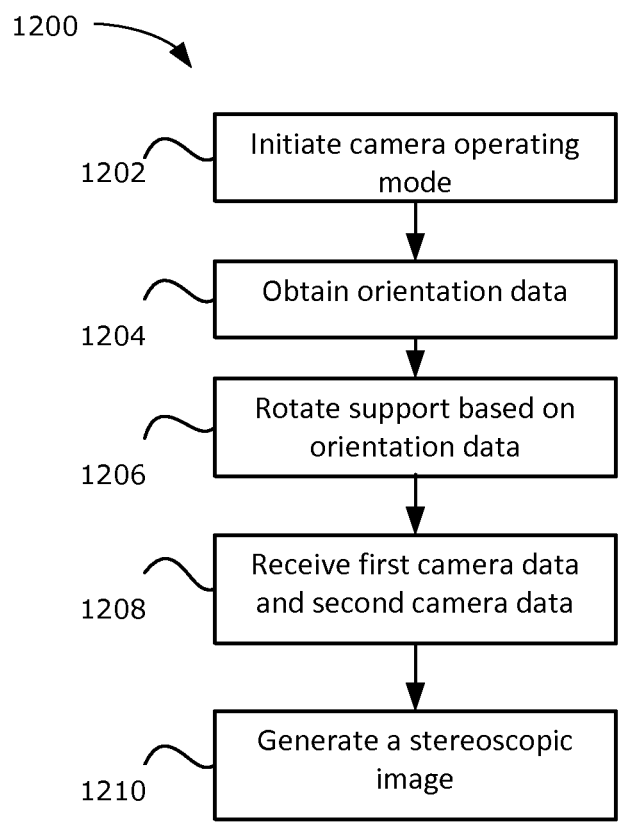
FIG. 13 is a flowchart illustrating an example method of generating a stereoscopic image in accordance with example embodiments of the present disclosure.

Referring now to FIG. 13, a flowchart of an example method 1200 of generating a stereoscopic image is illustrated. The electronic device 201 may be configured to perform the method 1200 of FIG. 13. In at least some example embodiments, the controller (which may include the processor 240 and/or an analog circuit) of the electronic device 201 is configured to perform the method 1200 of FIG. 13. One or more applications 225 or modules on the electronic device 201 may contain computer readable instructions which cause the controller of the electronic device 201 to perform the method 1200 of FIG. 13. In at least some example embodiments, the camera application 280 stored in memory of the electronic device 201 is configured to perform the method 1200 of FIG. 13. More particularly, the camera application 280 may contain computer readable instructions which, when executed, cause the controller to perform the method 1200 of FIG. 13.

It will be appreciated that the method 1200 of FIG. 13 may, in at least some example embodiments, be provided by other software applications or modules apart from those specifically discussed above, for example the operating system 223. Accordingly, any features which are referred to as being performed by the electronic device 201 may be performed by any one or more of the software applications or modules referred to above or other software modules. In at least some example embodiments, at least some of the method 1200 of FIG. 13 may be performed by or may rely on other applications or modules.

The method 1200 includes, at 1202, initiating a camera operating mode on the electronic device 201. For example, the electronic device 201 may have at least two operating modes: a camera operating mode and a non-camera operating mode. In at least some example embodiments, when the camera operating mode is initiated, the camera application 280 may provide an interface to access the features and functions of the associated camera modules 253*a*, 253*b*. For example, a user of the electronic device 201 may interact with the interface in order to control the camera modules 253*a*, 253*b* for capturing images. When the camera operating mode is not initiated (for example, the non-camera operating mode is active), the features and functions of the camera modules 253*a*, 253*b* may not be manipulated.

In at least some example embodiments, the camera operating mode may be initiated in response to receiving an instruction to initiate the camera operating mode on the electronic device 201. The instruction may be received, for example, from an input interface 206 associated with the electronic device 201. For example, the instruction may be received from a navigational input device, such as a trackball, track pad or touchscreen display, or a physical keyboard associated with the electronic device 201.

At 1204, the electronic device 201 may obtain orientation data from the orientation sensor 282. The orientation data may be generated by the orientation sensor 282 based on the orientation of the electronic device 201. The orientation data may indicate the orientation of the electronic device 201 relative to the gravitational field of the earth. In at least some example embodiments, the orientation data may be analyzed to classify the orientation of the electronic device 201 as one of a predefined set of possible orientations, such as, a portrait orientation, a landscape orientation and/or specific orientations in between a portrait orientation and a landscape orientation (for example, tilted orientations). Accordingly, the classified orientation data may indicate the typical orientations of the electronic device 201 when held by a user to capture images.

At 1206, the electronic device 201 rotates the support 120 based on the orientation data. For example, the electronic device 201 may rotate the support 120 to horizontally align the first camera module 253*a* and the second camera module 253*b* for the particular orientation of the electronic device

201. That is, the electronic device 201 may attempt to align these camera modules 253a, 253b with the horizon. For example, if the orientation of the electronic device 201 is changed from a portrait orientation to a landscape orientation as indicated by the orientation data, the electronic device 201 may rotate the support to horizontally align the camera modules 253a, 253b for a landscape orientation of the electronic device 201. The level and type of rotation of the support depends on the configuration of the camera assembly 285 within the electronic device 201 which was described in greater detail above.

It is noted that, in at least some example embodiments, the configuration of the camera assembly 285 within the electronic device 201 is in such a manner that the camera modules 253a, 253b may not be horizontally aligned for orientations in between the portrait orientation and the landscape orientation. That is, there may be some orientations of the electronic device 201 at which the camera modules 253a, 253b may not be aligned precisely with the horizon. For example, the electronic device 201 may only support two positions for the camera modules—a first position (which may be associated with a portrait orientation) and a second position (which may be associated with a landscape orientation). In some such example embodiments, prior to rotating the support 120, the electronic device 201 may further determine whether its orientation is closer to a portrait orientation or a landscape orientation based on the orientation data. For example, if the orientation data indicates that the electronic device 201 is oriented in between the portrait orientation and the landscape orientation, the electronic device 201 may determine whether its tilted orientation is nearer to the portrait orientation or the landscape orientation.

If the electronic device 201 determines that its orientation is closer to the portrait orientation, the support 120 is rotated to a first position. For example, the support 120 is rotated to approximately horizontally align the camera modules 253a, 253b for a portrait orientation of the electronic device 201, at the first position. However, if the electronic device 201 determines that its orientation is closer to the landscape orientation, the support 120 is instead rotated to a second position. For example, the support 120 is rotated to approximately horizontally align the camera modules 253a, 253b for a landscape orientation of the electronic device 201, at the second position. Accordingly, the camera modules 253a, 253b may be horizontally aligned for a portrait orientation or a landscape orientation of the electronic device 201, even though the electronic device 201 is held at a tilted orientation.

In at least some example embodiments, the support 120 may only rotate within the camera operating mode (i.e. 1206 may only be performed when the electronic device is operating in the camera operating mode). That is, at least one or more of the camera modules 253a, 253b (depending on the configuration of the camera assembly 285) are rotatable with the support when the camera operating mode is initiated within the electronic device 201.

After rotation of the support 120 (which may include horizontal alignment of the camera modules 253a, 253b for a particular orientation of the electronic device 201), the electronic device 201, at 1208, receives first camera data generated by the first camera module 253a and second camera data generated by the second camera module 253b. For example, the camera modules 253a, 253b may be configured to capture a stereoscopic image. The camera modules 253a, 253b may be operated to simultaneously capture images that may collectively represent stereoscopic image data.

In at least some embodiments, the camera data from the camera modules 253a, 253b may be received in response to the receipt of an instruction to capture a stereoscopic image by the camera modules 253a, 253b. The instruction may be received, for example, from an input interface 206 associated with the electronic device 201. For example, the instruction may be received from a navigational input device, such as a trackball, track pad or touchscreen display, or a physical keyboard associated with the electronic device 201.

As mentioned above, in at least some example configurations of the camera assembly 285 within the electronic device 201, one or more of the camera modules 253a, 253b may not be in an upright position after rotation of the support 120 to the second position (as illustrated in the configuration of FIG. 7 where the first camera module is stationary relative to the main body 140 and is disposed along the axis of rotation 125). In such example embodiments, an image captured by the one or more camera modules 253a, 253b (for example, the fixed first camera module 253a) may be rotated to correct for a change in orientation of the electronic device 201. That is, a software-based rotation may be performed on the camera data. The rotation of the captured image may be performed by a lossy and/or lossless method as appreciated by those skilled in the art.

The electronic device 201 may then, at 1210, generate a stereoscopic image from the received camera data (for example, of the images captures by the camera modules 253a, 253b). The stereoscopic image may be displayed on the display 204 of the electronic device 201.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An electronic device comprising:
    a main body;
    a support coupled with the main body, the support rotatable about an axis of rotation between a plurality of positions including a first position and a second position;
    a first camera for generating first image data;
    a second camera for generating second image data, the second camera positioned in spaced relation to the first camera, the second camera mounted on the support away from the axis of rotation;
    an electric motor coupling the support to the main body at the axis of rotation that rotates the support about the axis of rotation;
    an orientation sensor for generating orientation data based on an orientation of the electronic device; and
    a controller coupled with the first camera and the second camera which:
        causes the electric motor to rotate the support based on the orientation data to horizontally align the first camera and the second camera by:

determining whether the orientation of the electronic device is closer to a portrait orientation or a landscape orientation based on the orientation data;
when the orientation of the electronic device is closer to the portrait orientation, causing the electric motor to place the support in the first position; and
when the orientation of the electronic device is closer to the landscape orientation, causing the electric motor to place the support in the second position, and
generates a stereoscopic image based on the first image data and the second image data,
wherein the support extends between the first camera and the second camera, and wherein the portrait orientation is an orientation in which the height of the electronic device is longer than its width and wherein the landscape orientation is an orientation in which the width of the electronic device is longer than its height.

2. The electronic device of claim 1, wherein the first camera is disposed on the support.

3. The electronic device of claim 1, wherein the first camera and the second camera are equidistant from the axis of rotation.

4. The electronic device of claim 1, wherein the first camera is disposed on the support in alignment with the axis of rotation.

5. The electronic device of claim 1, wherein the first camera is stationary relative to the main body and is disposed along the axis of rotation, and wherein the controller rotates an image captured by the first camera prior to generating the stereoscopic image when the support is in the second position.

6. The electronic device of claim 1, wherein the main body comprises:
a housing for housing components of the electronic device, the housing having one or more transparent portions for allowing external light to pass to image sensors associated with the first camera and the second camera, wherein the one or more transparent potions of the housing includes a first transparent portion aligned with the first camera, a second transparent portion aligned with the second camera when the support is in the first position, and a third transparent portion aligned with the second camera when the support is in the second position.

7. The electronic device of claim 1, wherein the main body comprises:
a housing for housing components of the electronic device, the housing having one or more transparent portions for allowing external light to pass to image sensors associated with the first camera and the second camera, wherein the one or more transparent portions of the housing includes a ring-shaped transparent portion centered around the axis of rotation, and the ring-shaped transparent portion is aligned with the first camera and the second camera.

8. A method implemented by a controller of an electronic device, the electronic device having:
a main body,
a support coupled with the main body, the support rotating about an axis of rotation between a plurality of positions including a first position and a second position;
a first camera for generating first image data;
a second camera for generating second image data, the second camera being positioned in spaced relation to the first camera, the second camera mounted on the support away from the axis of rotation, the support extending between the first camera and the second camera;
an electric motor coupling the support to the main body at the axis of rotation that rotates the support about the axis of rotation;
an orientation sensor for generating orientation data based on an orientation of the electronic device,
the method comprising:
causing the electric motor to rotate the support based on the orientation data to horizontally align the first camera and the second camera by:
determining whether the orientation of the electronic device is closer to a portrait orientation or a landscape orientation based on the orientation data;
when the orientation of the electronic device is closer to the portrait orientation, placing the support in the first position;
when the orientation of the electronic device is closer to the landscape orientation, placing the support in the second position; and
generating a stereoscopic image based on the first image data and the second image data,
wherein the portrait orientation is an orientation in which the height of the electronic device is longer than its width and wherein the landscape orientation is an orientation in which the width of the electronic device is longer than its height.

9. The method of claim 8, wherein the first camera is stationary relative to the main body and is disposed along the axis of rotation, and wherein the method further comprises: rotating an image captured by the first camera when the support is in the second position.

10. The method of claim 8, wherein the electronic device has at least two operating modes including a camera operating mode, and wherein said rotation is performed when the camera operating mode is active but is not performed when another operating mode is active.

11. A camera assembly comprising:
an electric motor providing rotational output;
a support coupled with the electric motor at an axis of rotation, the support rotatable between a plurality of positions including a first position and a second position;
a first camera for generating first image data;
a second camera for generating second image data, the second camera positioned in spaced relation to the first camera, the second camera mounted on the support away from the axis of rotation; and
a controller coupled with the first camera and the second camera which:
causes the electric motor to rotate the support based on orientation data of the camera assembly to horizontally align the first camera and the second camera by:
determining whether an orientation of the camera assembly is closer to a portrait orientation or a landscape orientation based on the orientation data;
when the orientation of the camera assembly is closer to the portrait orientation, causing the electric motor to place the support in a first position; and
when the orientation of the camera assembly is closer to the landscape orientation, causing the electric motor to place the support in a second position different from the first position, and
generates a stereoscopic image based on the first image data and the second image data,
wherein the support extends between the first camera and the second camera, and wherein the portrait orientation is an orientation in which the height of the electronic device is longer than its width and wherein the landscape orientation is an orientation in which the width of the electronic device is longer than its height.

12. The camera assembly of claim 11, wherein the first camera is disposed on the support.

13. The camera assembly of claim 12, wherein the first camera is disposed on the support in alignment with the axis of rotation.

14. The camera assembly of claim 12, wherein the first camera is disposed on the support away from the axis of rotation.

\* \* \* \* \*